(12) United States Patent
Tanaka et al.

(10) Patent No.: US 11,114,825 B2
(45) Date of Patent: Sep. 7, 2021

(54) JOINING METHOD OF ELECTRIC WIRES

(71) Applicant: Yazaki Corporation, Tokyo (JP)

(72) Inventors: Shigeru Tanaka, Shizuoka (JP); Masayuki Kataoka, Shizuoka (JP)

(73) Assignee: YAZAKI CORPORATION, Tokyo (JP)

( * ) Notice: Subject to any disclaimer, the term of this patent is extended or adjusted under 35 U.S.C. 154(b) by 699 days.

(21) Appl. No.: 15/726,111

(22) Filed: Oct. 5, 2017

(65) Prior Publication Data

US 2018/0131168 A1    May 10, 2018

(30) Foreign Application Priority Data

Nov. 10, 2016 (JP) .............................. JP2016-219843

(51) Int. Cl.
*H02G 1/14* (2006.01)
*H01R 43/02* (2006.01)
*H01R 4/02* (2006.01)
*H01B 7/02* (2006.01)
*H01R 4/10* (2006.01)
*H01R 4/70* (2006.01)

(52) U.S. Cl.
CPC .............. *H02G 1/145* (2013.01); *H01B 7/02* (2013.01); *H01R 4/021* (2013.01); *H01R 4/029* (2013.01); *H01R 43/0214* (2013.01); *H01R 4/10* (2013.01); *H01R 4/70* (2013.01)

(58) Field of Classification Search
CPC .......... H02G 1/145; H01B 7/02; H01R 4/021; H01R 4/029; H01R 4/70; H01R 4/10; H01R 43/0214

USPC ................... 29/869, 870, 871, 868, 872, 873
See application file for complete search history.

(56) References Cited

U.S. PATENT DOCUMENTS 2,771,540 A * 11/1956 Dittmore ................. H01F 30/10
    219/85.14
2,803,695 A *  8/1957 Woolley, Jr. ........... H01R 4/206
    174/87

(Continued)

FOREIGN PATENT DOCUMENTS

| CN | 101490903 A | 7/2009 |
| JP | 2-241675 A  | 9/1990 |

(Continued)

OTHER PUBLICATIONS

Japanese Office Action for the related Japanese Patent Application No. 2016-219843 dated Nov. 13, 2018.

(Continued)

*Primary Examiner* — Peter Dungba Vo
*Assistant Examiner* — Kaying Kue
(74) *Attorney, Agent, or Firm* — Kenealy Vaidya LLP

(57) ABSTRACT

In a joining method of an electric wire, an end of a first conductor is held by a holding surface of a first jig electrode from an outer circumference side and an end of a second conductor is held by a holding surface of a second jig electrode from an outer circumference side to butt and join the ends of the first conductor and the second conductor in the axial direction while heating the ends. Then, a melted material is bulged outward from an outer circumferential surface of a joining portion to a bulge molding portion formed to surround a joining portion of the ends of the first conductor and the second conductor.

21 Claims, 6 Drawing Sheets

(56) References Cited

U.S. PATENT DOCUMENTS

| | | | | |
|---|---|---|---|---|
| 2,812,506 A | * | 11/1957 | Merrill | H01R 43/042 |
| | | | | 439/281 |
| 2,845,521 A | * | 7/1958 | Trickle, Jr. | B23K 1/0004 |
| | | | | 219/85.14 |
| 3,626,363 A | * | 12/1971 | McIver | H01R 4/20 |
| | | | | 439/880 |
| 8,936,187 B2 | * | 1/2015 | Hino | H01R 43/02 |
| | | | | 228/112.1 |
| 9,666,955 B2 | | 5/2017 | Sugino | |
| 2006/0121773 A1 | * | 6/2006 | Ichikawa | H01R 4/70 |
| | | | | 439/408 |
| 2009/0249616 A1 | | 10/2009 | Froschl | |

FOREIGN PATENT DOCUMENTS

| | | |
|---|---|---|
| JP | 9-29447 A | 2/1997 |
| JP | 2009-539207 A | 11/2009 |
| JP | 2012-223786 A | 11/2012 |
| JP | 2016-58137 A | 4/2016 |

OTHER PUBLICATIONS

Chinese Office Action for the related Chinese Patent Application No. 201711098228.9 dated Mar. 1, 2019.

* cited by examiner

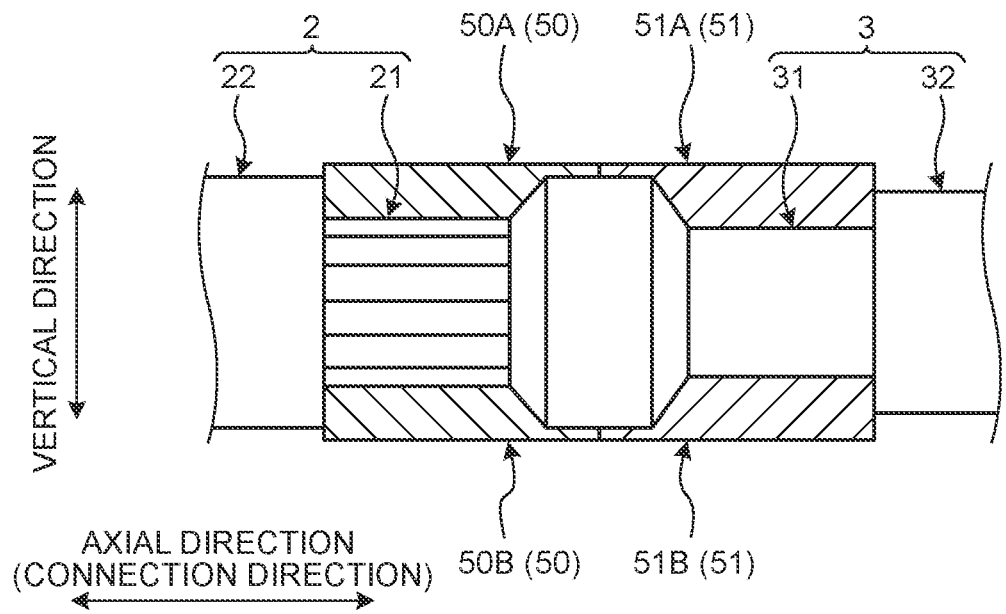
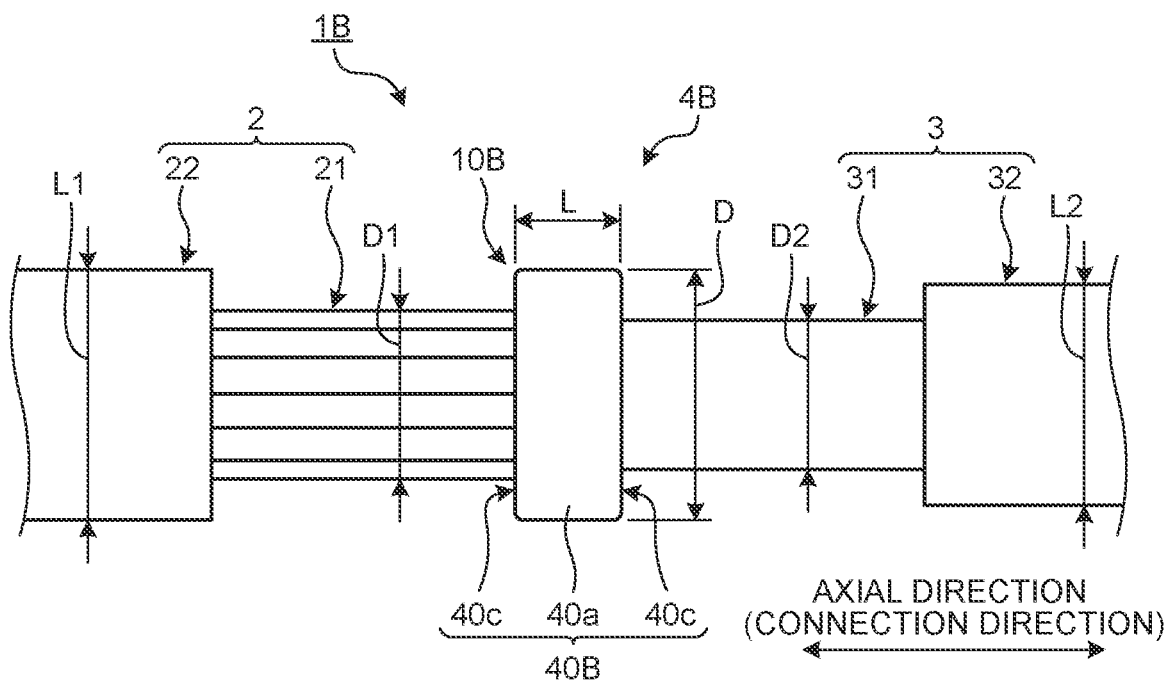

AXIAL DIRECTION
(CONNECTION DIRECTION)

AXIAL DIRECTION
(CONNECTION DIRECTION)

JOINING METHOD OF ELECTRIC WIRES

CROSS-REFERENCE TO RELATED APPLICATION(S)

The present application claims priority to and incorporates by reference the entire contents of Japanese Patent Application No. 2016-219843 filed in Japan on Nov. 10, 2016.

BACKGROUND OF THE INVENTION

1. Field of the Invention

The present invention relates to a joining method of electric wires.

2. Description of the Related Art

As a traditional technique for joining electric wires, for example, Japanese Patent Application Laid-Open No. 2016-58137 discloses a connection portion in which a single core wire 4 is substantially coaxially connected to a twisted wire 5 in a state where a crushed portion 8A formed on a conductor where an end of the single core wire 4 is exposed and a joint block 11A formed by exposing the end of the twisted wire 5 and welding element wires to each other are overlapped with each other.

Japanese Patent Application Laid-Open No. 2012-223786 discloses a conductive wire welding tube which is formed in a tubular shape having a hollow portion to which two lead wires can be inserted from both sides to suppress an increase in a sectional area of a welding portion when the ends of the two lead wires are welded.

However, in a case where the electric wire is joined with the joining method described in Japanese Patent Application Laid-Open No. 2016-58137 A, contact resistance increases electric resistance of the joining portion, and heat generation in the joining portion cannot be suppressed. Therefore, the technique in Japanese Patent Application Laid-Open No. 2016-58137 has room for improvement. Furthermore, according to the joining method of the electric wires described in Japanese Patent Application Laid-Open No. 2012-223786, the strength of the joining portion cannot be improved, and there is room for improvement.

SUMMARY OF THE INVENTION

An object of the present invention is to provide a joining method of electric wires which can suppress heat generation and improve strength of a joining portion of the electric wires.

In order to achieve the above mentioned object, a joining method of electric wires according to one aspect of the present invention includes a holding step of arranging a conductive first conductor formed by a plurality of element wires and a conductive second conductor formed in a bar shape to be opposed to each other in an axial direction, holding an end of the first conductor by a first holding surface of a first jig electrode from an outer circumference side, and holding an end of the second conductor by a second holding surface of a second jig electrode from an outer circumference side; an approaching step of relatively moving the first jig electrode and the second jig electrode to be opposed to each other in the axial direction and moving the end of the first conductor and the end of the second conductor to be closer to each other; and a joining and molding step of abutting and joining the end of the first conductor and the end of the second conductor while heating the ends by energizing the first jig electrode and the second jig electrode and bulging a melted material outward from an outer circumferential surface of a joining portion to a bulge molding portion formed to surround the joining portion of the end of the first conductor and the end of the second conductor, wherein the bulge molding portion has molding surfaces to mold the melted material and is formed so that widths of the molding surfaces opposed to each other so as to sandwich the joining portion in an orthogonal direction orthogonal to the axial direction are larger than the larger one of the widths of the first holding surfaces opposed to each other so as to sandwich the first conductor in the orthogonal direction and the widths of the second holding surfaces opposed to each other so as to sandwich the second conductor in the orthogonal direction.

According to another aspect of the present invention, in the joining method of electric wires, it is possible to configure that the molding surface forms a smooth surface around an axial direction of the melted material.

According to still another aspect of the present invention, in the joining method of electric wires, it is possible to configure that the molding surface forms the smooth surface in parallel to the axial direction and around the axial direction.

According to still another aspect of the present invention, in the joining method of electric wires, it is possible to configure that the molding surface forms the smooth surface as a columnar outer surface having a central axis in the axial direction.

According to still another aspect of the present invention, in the joining method of electric wires, it is possible to configure that the molding surface forms the smooth surfaces as tapered surfaces to be tapered from both ends of the outer surface in the axial direction toward the respective outer surfaces of the first conductor and the second conductor.

According to still another aspect of the present invention, in the joining method of electric wires, it is possible to configure that the molding surface is divided into a first molding surface and a second molding surface in the axial direction, the first jig electrode is formed integrally with the first molding surface in the axial direction, and the second jig electrode is formed integrally with the second molding surface in the axial direction.

According to still another aspect of the present invention, in the joining method of electric wires, it is possible to configure that the width of the molding surface is formed to be smaller than the smaller one of a width in the orthogonal direction of a first wiring member including the first conductor and an insulating first insulating cover portion covering a side of an outer circumference of the first conductor and a width in the orthogonal direction of a second wiring member including the second conductor and an insulating second insulating cover portion covering a side of an outer circumference of the second conductor, and a length of the molding surface in the axial direction is formed to be shorter than the shorter one of the width of the first wiring member in the orthogonal direction and the width of the second wiring member in the orthogonal direction.

The above and other objects, features, advantages and technical and industrial significance of this invention will be better understood by reading the following detailed description of presently preferred embodiments of the invention, when considered in connection with the accompanying drawings.

BRIEF DESCRIPTION OF THE DRAWINGS

FIG. 6 is a diagram to describe an exemplary joining method of the electric wires according to the first embodiment;

FIG. 7 is a side view of a schematic structure of the joint structure of the electric wires according to a second embodiment;

DETAILED DESCRIPTION OF THE PREFERRED EMBODIMENTS

Embodiments of the present invention will be described in detail below with reference to the drawings. The present invention is not limited to the following embodiments. In addition, components in the following embodiments include those that can be easily replaced by those skilled in the art or those substantially the same. In addition, various omissions, replacements, and changes can be made to the components in the embodiments without departing from the scope of the invention.

First Embodiment

Figure 1:
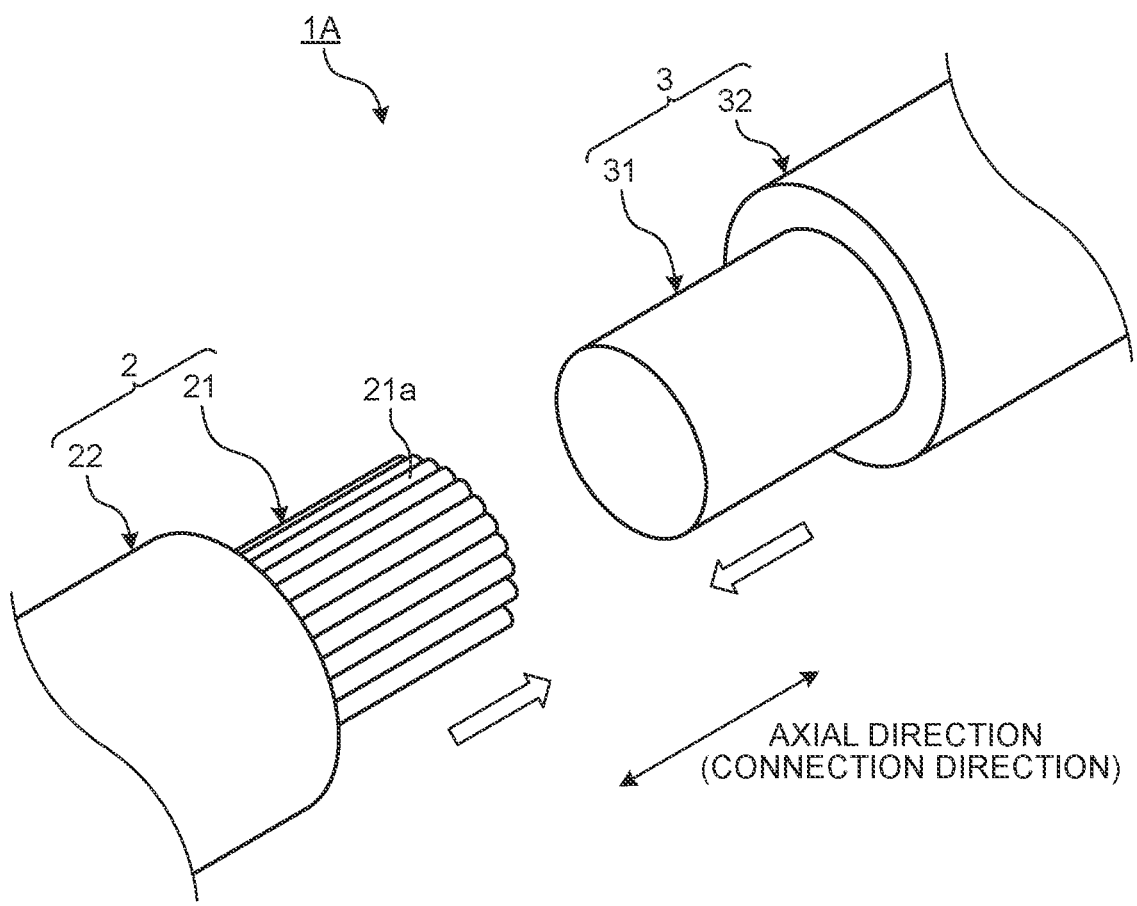
FIG. 1 is an exploded perspective view of a joint structure of electric wires according to a first embodiment.
Figure 2:
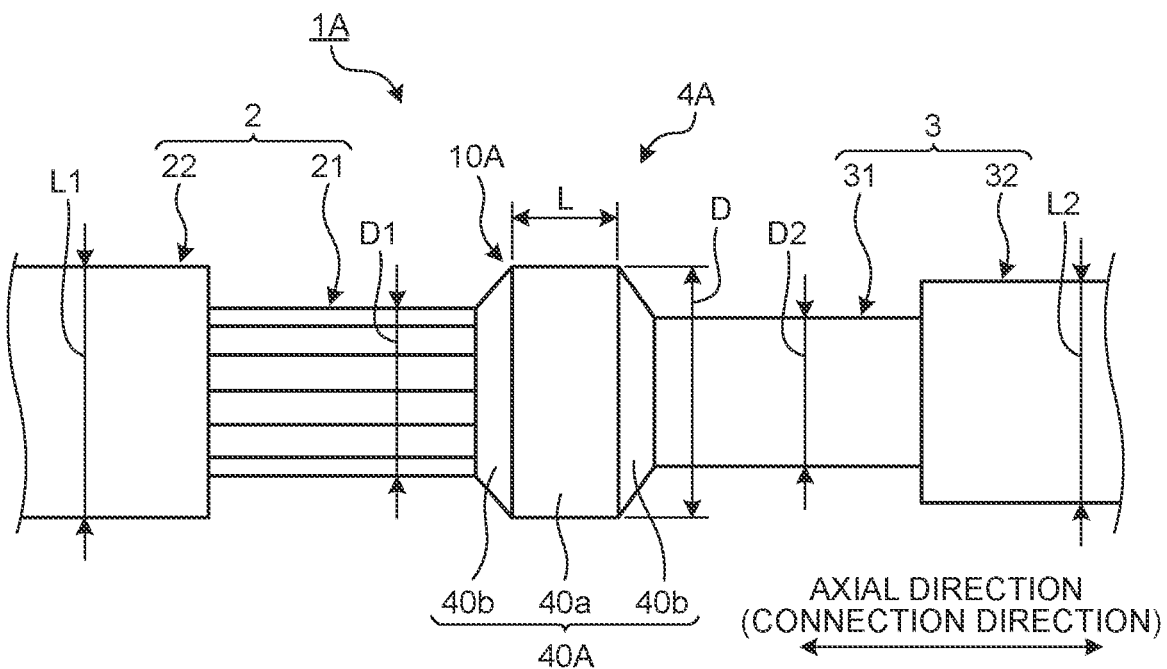
FIG. 2 is a side view of a schematic structure of the joint structure of the electric wires according to the first embodiment.
Figure 3:
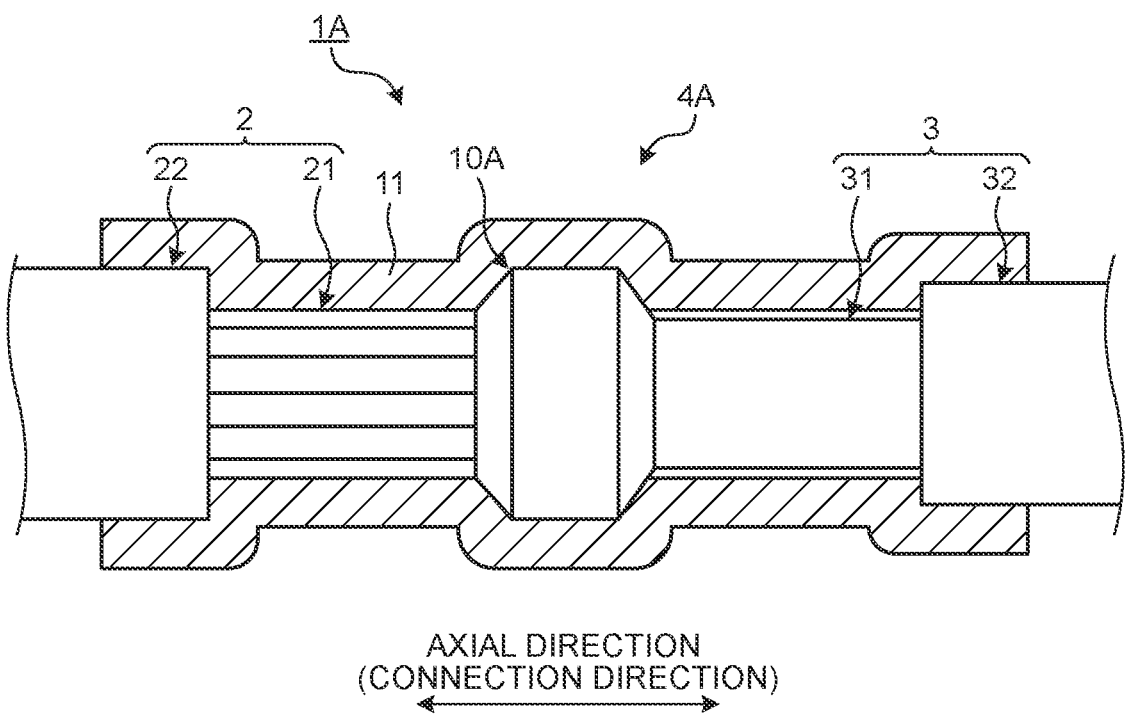
FIG. 3 is a partial cross-sectional view of a schematic structure of the joint structure of the electric wires according to the first embodiment.
Figure 4:
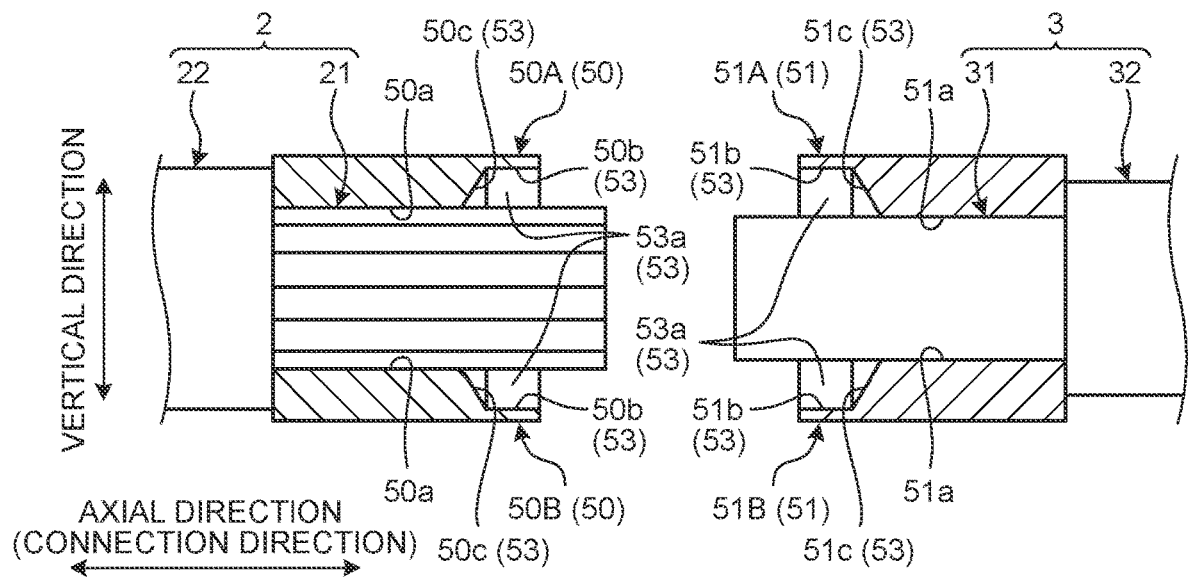
FIG. 4 is a diagram to describe an exemplary joining method of the electric wires according to the first embodiment.
Figure 5:
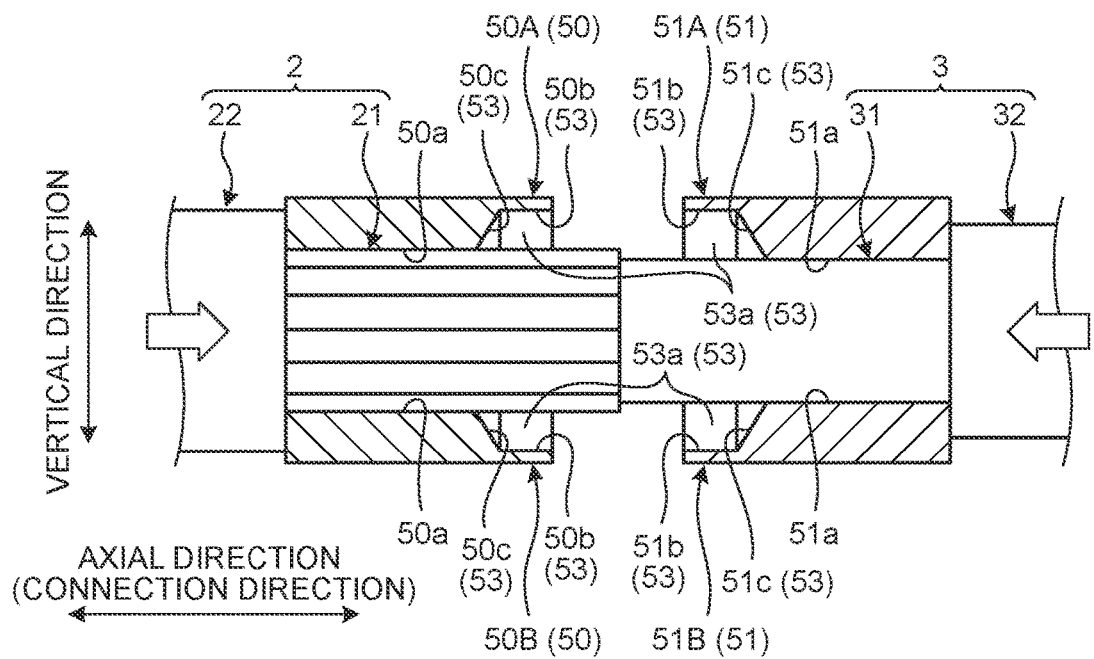
FIG. 5 is a diagram to describe an exemplary joining method of the electric wires according to the first embodiment.

A joint structure of electric wires according to a first embodiment is described with reference to FIGS. 1 to 6. FIG. 1 is an exploded perspective view of the joint structure of the electric wires according to the first embodiment. FIG. 2 is a side view of a schematic structure of the joint structure of the electric wires according to the first embodiment. FIG. 3 is a partial cross-sectional view of a schematic structure of the joint structure of the electric wires according to the first embodiment. FIGS. 4 to 6 are diagrams to describe an exemplary joining method of the electric wires according to the first embodiment. In FIG. 4, a state before two electric wires attached to jig electrodes are joined is illustrated. In FIG. 5, a state at the time of joining the two electric wires attached to the jig electrodes is illustrated. In FIG. 6, a state at the time when the two electric wires attached to the jig electrodes have been joined to each other is illustrated.

An electric wire 1A, to which a joint structure of electric wires according to the first embodiment is applied, is wired in a vehicle such as an electric vehicle (EV), a hybrid vehicle (HEV), a plug-in hybrid vehicle (PHEV) and is used as a conducting path for power supply and communication. In the electric wire 1A, a first electric wire 2 which has relatively high flexibility and excellent bendability is connected to a second electric wire 3 which has relatively high rigidity and easily holds the shape along a wiring route. With this connection, the electric wire 1A realizes an appropriate balance of the flexibility and the rigidity required according to each part of the electric wire 1A. As a result, an excellent work efficiency in the wiring, excellent handling property, and the like are secured. Specifically, the electric wire 1A includes the first electric wire 2, the second electric wire 3, and a joint structure 4A.

The first electric wire 2 is a first wiring member and has a conductive first conductor 21 formed by a plurality of element wires 21a and an insulating first insulating cover portion 22 covering an outer circumference side of the first conductor 21. The first conductor 21 is made of a conductive metal member. The first conductor 21 is formed to extend while having substantially the same diameter relative to a linearly extending direction (may be referred to as "axial direction" below). The element wires 21a forming the first conductor 21 are made of conductive metal such as copper, a copper alloy, aluminum, an aluminum alloy, or the like. Here, the first conductor 21 is a simple bundle of the plurality of element wires 21a. However, the first conductor 21 may be formed by twisting the plurality of element wires 21a. The first insulating cover portion 22 is an electric wire cover for covering the outer circumference side of the first conductor 21. The first insulating cover portion 22 is provided in contact with an outer circumferential surface of the first conductor 21. For example, the first insulating cover portion 22 is formed by performing extrusion molding to an insulating resin material (including PP, PVC, crosslinked PE, and the like, appropriately selected in consideration of abrasion resistance, chemical resistance, heat resistance, and the like). The first insulating cover portion 22 is formed from one end to the other end of the first conductor 21 in the axial direction. At the end of the first conductor 21 of the first electric wire 2, the first insulating cover portion 22 is peeled off, and the end of the first conductor 21 is exposed from the first insulating cover portion 22. In the first electric wire 2, the end of the first conductor 21 is physically and electrically joined to the end of a second conductor 31 of the second electric wire 3 to be described later. Regarding the first electric wire 2, for example, the sectional shape of the first conductor 21 in the axial direction is a substantially circular shape, the sectional shape of the first insulating cover portion 22 in the axial direction is a substantially annular shape. The first electric wire 2 has a substantially circular sectional shape as a whole.

The second electric wire 3 is a second wiring member and has the conductive second conductor 31 formed in a bar shape and an insulating second insulating cover portion 32 covering an outer circumference side of the second conductor 31. The second conductor 31 is made of a conductive metal member. The second conductor 31 is formed in a bar shape and has a pillar-shaped conductor structure of which the sectional shape is a substantially perfect circle. The second conductor 31 is formed to extend while having substantially the same diameter with respect to the axial direction. The second conductor 31 is made of conductive metal such as copper, a copper alloy, aluminum, and an aluminum alloy. The second insulating cover portion 32 is an electric wire cover for covering the outer circumference side of the second conductor 31. The second insulating cover portion 32 is provided in contact with an outer circumferential surface of the second conductor 31. For example, the second insulating cover portion 32 is formed by performing extrusion molding to an insulating resin material (including PP, PVC, crosslinked PE, and the like, appropriately selected in consideration of abrasion resistance, chemical resistance, heat resistance, and the like). The second insulating cover portion 32 is formed from one end to the other end of the second conductor 31 in the axial direction. At the end of the second conductor 31 of the second electric wire 3, the second insulating cover portion 32 is peeled off, and the end of the second conductor 31 is exposed from the second insulating cover portion 32. In the second electric wire 3, the end of the second conductor 31 is physically and electrically joined to the end of the first conductor 21 of the first electric wire 2 described above. Regarding the second electric wire 3, for example, the sectional shape of the second conductor 31 in the axial direction is a substantially circular shape, the sectional shape of the second insulating cover portion 32 in the axial direction is a substantially annular shape. The second electric wire 3 has a substantially circular sectional shape as a whole. The sectional shape of the second conductor 31 is not limited to the substantially perfect circle and may be, for example, a rectangle or the like. In addition, the second conductor 31 may have a cylindrical conductor structure.

In the joint structure 4A, the first electric wire 2 and the second electric wire 3 are physically and electrically joined to each other. The joint structure 4A includes a joining portion 10A and a protective tube 11.

The joining portion 10A is a part where the first conductor 21 and the second conductor 31 are joined to each other. The joining portion 10A is formed by butting and joining the end of the first conductor 21 and the end of the second conductor 31 to each other in the axial direction, for example, by resistance welding. Here, the resistance welding is a method for joining metal conductors by energizing the metal conductors to be welded to generate Joule heat and welding the metal conductors, and then, simultaneously pressurizing the metal conductors and cutting off the energization. The connection direction of the first conductor 21 and the second conductor 31 in the joining portion 10A is the direction along the axial direction of the first conductor 21 and the second conductor 31. The joining portion 10A has a bulging portion 40A formed at the time of joining.

The bulging portion 40A is a part where a smooth surface is formed by the molding surface of a jig electrode (or jig) to be used at the time of the resistance welding on the melted material bulged outward from the outer circumferential surface of the joining portion 10A. The smooth surface in the present embodiment is different from projections, so-called burrs, of the melted material bulged from the joining portion 10A. That is, the smooth surface is formed by crushing the burr of the melted material by the molding surface. The bulging portion 40A has an outer surface 40a and a pair of tapered surfaces 40b as the smooth surface. The outer surface 40a is provided in an orthogonal direction orthogonal to the axial direction from the outer circumferential surface of the joining portion 10A (simply referred to as "orthogonal direction" below) and is formed in parallel to the axial direction and around the axial direction. The pair of tapered surfaces 40b is formed to be tapered from the both ends of the outer surface 40a in the axial direction toward the respective outer circumferential surfaces of the first conductor 21 and the second conductor 31.

The protective tube 11 is an insulating protective member that covers at least the entire circumference of the joining portion 10A having the bulging portion 40A. For example, the protective tube 11 is formed by molding an insulating resin material (including PP, PVC, crosslinked PE, and the like, appropriately selected in consideration of abrasion resistance, chemical resistance, heat resistance, and the like). Here, for example, a tubular heat shrinkable tube can be used as the protective tube 11. The protective tube 11 is attached from, for example, one of the ends of the first electric wire 2 and the second electric wire 3. In the cylindrical protective tube 11, the joining portion 10A between the first conductor 21 and the second conductor 31 is inserted. When heated, the protective tube 11 shrinks, and the diameter of the protective tube 11 is decreased. Then, the protective tube 11 partially adheres the side of the outer circumference of the joining portion 10A and covers the joining portion 10A.

Next, a joining method of the electric wire 1A described above will be described with reference to FIGS. 4 to 6. In the joining method of the electric wire 1A according to the first embodiment, a resistance welding machine (not illustrated) including a pair of jig electrodes is used.

In a holding process illustrated in FIG. 4, the first electric wire 2 in which the end of the first conductor 21 is exposed from the first insulating cover portion 22 and the second electric wire 3 in which the end of the second conductor 31 is exposed from the second insulating cover portion 32 are set in the resistance welding machine. Specifically, in the holding process, the first conductor 21 and the second conductor 31 are arranged to be opposed to each other in the axial direction, and the end of the first conductor 21 is held by holding surfaces 50a in first jig electrodes 50 (50A and 50B) from the side of the outer circumference, and the end of the second conductor 31 is held by holding surfaces 51a in second jig electrodes 51 (51A and 51B) from the side of the outer circumference.

Although each of the first jig electrodes 50 and the second jig electrodes 51 is an electrode for welding, each of the first jig electrodes 50 and the second jig electrodes 51 is also a jig for holding the first conductor 21 and the second conductor 31 to be welded. The first jig electrode 50 and the second jig electrode 51 respectively hold the end of the first conductor 21 and the end of the second conductor 31 so as to face each other in the axial direction. The first jig electrode 50 is divided into an upper jig electrode 50A and a lower jig electrode 50B. The upper jig electrode 50A and the lower jig electrode 50B hold the end of the first conductor 21 so as to sandwich the end of the first conductor 21 in the orthogonal direction (for example, vertical direction illustrated in FIG. 4). Similar to the first jig electrode 50, the second jig electrode 51 is divided into an upper jig electrode 51A and a lower jig electrode 51B. The upper jig electrode 51A and the lower jig electrode 51B hold the end of the second conductor 31 in the orthogonal direction (for example, vertical direction illustrated in FIG. 4).

The first jig electrode 50 has the holding surface 50a, a molding surface 50b, and a tapered molding surface 50c. The holding surface 50a is a first holding surface, and holds the first conductor 21 from the side of the outer circumference. The holding surface 50a is a cylindrical inner circumferential surface, and is divided in the orthogonal direction. That is, the holding surfaces 50a hold the end of the first conductor 21 so as to sandwich the end in the orthogonal direction. The molding surface 50b is a cylindrical inner circumferential surface formed on the side of the joining portion 10A from the holding surface 50a in the axial direction. The molding surface 50b is a first molding surface that forms the outer surface 40a of the bulging portion 40A. The first jig electrode 50 abuts the second jig electrode 51 in the axial direction so that the molding surface 50b is coupled to a molding surface 51b of the second jig electrode 51 in the axial direction. Accordingly, a smooth surface is formed in parallel to the axial direction and around the axial direction. The tapered molding surface 50c is a molding surface forming one of the tapered surfaces 40b of the bulging portion 40A.

The second jig electrode 51 has a holding surface 51a, the molding surface 51b, and a tapered molding surface 51c. The holding surface 51a is a second holding surface, and holds the second conductor 31 from the side of the outer circumference. The holding surface 51a is a cylindrical inner circumferential surface, and is divided in the orthogonal direction. That is, the holding surfaces 51a hold the end of the second conductor 31 so as to sandwich the end in the orthogonal direction. The molding surface 51b is a cylindrical inner circumferential surface formed on the side of the joining portion 10A from the holding surface 51a in the axial direction. The molding surface 51b is a second molding surface that forms the outer surface 40a of the bulging portion 40A. The first jig electrode 50 abuts the second jig electrode 51 in the axial direction so that the molding surface 51b is coupled to the molding surface 50b in the axial direction. Accordingly, a smooth surface is formed in parallel to the axial direction and around the axial direction. The tapered molding surface 51c is a molding surface forming the other tapered surface 40b of the bulging portion 40A.

In the present embodiment, each of the first jig electrode 50 and the second jig electrode 51 has a bulge molding portion 53 which is formed to surround the joining portion 10A at the ends of the first conductor 21 and the second conductor 31 at the time of assembly, that is, at the time of a joining and molding process illustrated in FIG. 6. A bulging space portion 53a is a space in which the melted material is bulged outward from the outer circumferential surface of the joining portion 10A. That is, the bulging space portion 53a is a space closed by the molding surfaces 50b and 51b, the tapered molding surfaces 50c and 51c, and the outer circumferential surface of the joining portion 10A in the joining and molding process. The bulge molding portion 53 is formed so that the widths of the molding surfaces 50b and 51b, opposed to each other so as to sandwich the joining portion 10A, in the orthogonal direction are larger than the larger one of the width of the holding surfaces 50a, opposed to each other so as to sandwich the first conductor 21, in the orthogonal direction and the width of the holding surfaces 51a, opposed to each other so as to sandwich the second conductor 31, in the orthogonal direction. It is preferable that the maximum width of the molding surfaces 50b and 51b, opposed to each other so as to sandwich the joining portion 10A, in the orthogonal direction be formed to be larger than the larger one of the width of the holding surfaces 50a, opposed to each other so as to sandwich the first conductor 21, in the orthogonal direction and the width of the holding surfaces 51a, opposed to each other so as to sandwich the second conductor 31, in the orthogonal direction. Furthermore, it is preferable that the maximum width of the molding surfaces 50b and 51b, opposed to each other so as to sandwich the joining portion 10A, in the orthogonal direction be formed to be smaller than the larger one of the width (or diameter) of the first electric wire 2 in the orthogonal direction and the width (or diameter) of the second electric wire 3 in the orthogonal direction.

The bulge molding portion 53 is formed so that the sectional area of an inner space surrounded by the molding surfaces 50b and 51b opposed each other so as to sandwich the joining portion 10A in the axial direction is larger than the larger one of the sectional area of an inner space surrounded by the holding surfaces 50a opposed to each other so as to sandwich the first conductor 21 in the axial direction and the sectional area of an inner space surrounded by the holding surfaces 51a opposed to each other so as to sandwich the second conductor 31 in the axial direction. It is preferable that the maximum sectional area of the inner space surrounded by the molding surfaces 50b and 51b opposed each other so as to sandwich the joining portion 10A in the axial direction be formed to be larger than the larger one of the sectional area of the inner space surrounded by the holding surfaces 50a opposed to each other so as to sandwich the first conductor 21 in the axial direction and the sectional area of the inner space surrounded by the holding surfaces 51a opposed to each other so as to sandwich the second conductor 31 in the axial direction. Furthermore, it is preferable that the maximum sectional area of the inner space surrounded by the molding surfaces 50b and 51b opposed to each other so as to sandwich the joining portion 10A in the axial direction be formed to be smaller than the larger one of the sectional area of the first electric wire 2 in the axial direction and the sectional area of the second electric wire 3 in the axial direction.

Next, in an approach process illustrated in FIG. 5, the first jig electrode 50 and the second jig electrode 51 are relatively moved to be opposed to each other in the axial direction, and the end of the first conductor 21 approaches the end of the second conductor 31.

Next, in the joining and molding process illustrated in FIG. 6, by energizing the first jig electrode 50 and the second jig electrode 51, while heating the ends of the first conductor 21 and the second conductor 31, the first conductor 21 and the second conductor 31 are butted and joined to each other in the axial direction, and the bulge molding portion 53 makes the melted material bulge outward from the outer circumferential surface of the joining portion 10A of the end of the first conductor 21 and the end of the second conductor 31. Then, the bulging portion 40A is formed by the molding surfaces 50b and 51b of the bulge molding portion 53 and the tapered molding surfaces 50c and 51c. Specifically, the end of the first conductor 21 is heated by energizing the first jig electrode 50, and the end of the second conductor 31 is heated by energizing the second jig electrode 51. After the end of the first conductor 21 and the end of the second conductor 31 have been sufficiently heated, the energization to the first jig electrode 50 and the second jig electrode 51 is stopped. Then, until the end of the first jig electrode 50 in the axial direction and the end of the second jig electrode 51 in the axial direction have contact with each other, the end of the first conductor 21 and the end of the second conductor 31 are pressurized to be butted to each other in the axial direction. At this time, the melted material generated at the time of metal bonding between the first conductor 21 and the second conductor 31 bulges to the bulge molding portion 53, and the bulging portion 40A is formed by the molding surfaces 50b and 51b and the tapered molding surfaces 50c and 51c. That is, the outer surface 40a of the bulging portion 40A is formed by the molding surface 50b of the first jig electrode 50 and the molding surface 51b of the second jig electrode 51. The pair of the tapered surfaces 40b of the bulging portion 40A is formed by the tapered molding surface 50c of the first jig electrode 50 and the tapered molding surface 51c of the second jig electrode 51.

As described above, the joint structure 4A of the electric wire 1A includes the conductive first conductor 21 formed by the plurality of element wires 21a, the conductive second conductor 31 formed in a bar shape, and the joining portion 10A formed by butting and joining the end of the first conductor 21 and the end of the second conductor 31 to each other in the axial direction. The joining portion 10A has the bulging portion 40A formed by molding the melted material bulged outward from the outer circumferential surfaces of the first conductor 21 and the second conductor 31 by the bulge molding portion 53. The bulging portion 40A has a sectional area larger than the larger one of the sectional area of the first conductor 21 in the axial direction and the sectional area of the second conductor 31 in the axial direction, and the smooth surface of the bulging portion 40A is formed around the axial direction. As a result, burrs of the melted material bulged outward from the outer circumferential surface of the joining portion 10A are crushed, the cost required for removing the burrs can be reduced, and damage to the protective tube 11 covering the joining portion 10A can be reduced. Furthermore, since the joining portion 10A becomes thicker than the first conductor 21 and the second conductor 31 and the sectional area of the joining portion 10A becomes larger than the sectional areas of the first conductor 21 and the second conductor 31, the electric resistance of the joining portion 10A is reduced, and heat generation of the joining portion 10A at the time of energization can be suppressed. Since the increase in the sectional area of the joining portion 10A increases the strength of the joining portion 10A, and, for example, durability of the joining portion of the electric wires relative to vehicle vibration can be improved.

In addition, in the joint structure 4A of the electric wire 1A, it is preferable that the bulging portion 40A be formed so that the diameter D of the columnar outer surface 40a is larger than the larger one of the diameter D1 of the first conductor 21 and the diameter D2 of the second conductor 31 and is equal to or smaller than the smaller one of the diameter of the first electric wire 2 and the diameter of the second electric wire 3. It is preferable that the bulging portion 40A be formed so that the length L of the outer surface 40a in the axial direction is shorter than the shorter one of the diameter L1 of the first electric wire 2 and the diameter L2 of the second electric wire 3. In this way, by defining the size of the part forming the cylindrical shape of the bulging portion 40A, that is, the diameter D and the length L in the axial direction of the outer surface 40a, the sectional area of the joining portion 10A having the bulging portion 40A in the axial direction can be set to be larger than each of the sectional areas of the first conductor 21 and the second conductor 31.

In the joint structure 4A of the electric wire 1A, since the bulging portion 40A is formed to cover the joining portion 10A from the outer circumference side, deterioration of the joining portion 10A due to corrosion can be suppressed.

The joining method of the electric wire 1A described above includes the holding process in which the conductive first conductor 21 formed by the plurality of element wires 21a and the conductive second conductor 31 formed in a bar shape are arranged to be opposed to each other in the axial direction, the end of the first conductor 21 is held by the holding surface 50a of the first jig electrode 50 from the outer circumference side, and the end of the second conductor 31 is held by the holding surface 51a of the second jig electrode 51 from the outer circumference side. The joining method of the electric wire 1A includes the approach process in which the first jig electrode 50 and the second jig electrode 51 are relatively moved to be opposed to each other in the axial direction, and the end of the first conductor 21 and the end of the second conductor 31 are moved closer to each other. The joining method of the electric wire 1A includes the joining and molding process in which the end of the first conductor 21 and the end of the second conductor 31 are butted and joined to each other in the axial direction while heating the ends of the first conductor 21 and the second conductor 31 by energizing the first jig electrode 50 and the second jig electrode 51 and the bulge molding portion 53 formed to surround the end of the first conductor 21 and the end of the second conductor 31 makes the melted material bulge outward from the outer circumferential surface of the joining portion 10A. The bulge molding portion 53 includes the molding surfaces 50b and 51b for molding the melted material and the tapered molding surfaces 50c and 51c. The bulge molding portion 53 is formed so that the widths of the molding surfaces 50b and 51b, opposed to each other so as to sandwich the joining portion 10A, in the orthogonal direction orthogonal to the axial direction are larger than the larger one of the width of the holding surfaces 50a, opposed to each other so as to sandwich the first conductor 21, in the orthogonal direction and the width of the holding surfaces 51a, opposed to each other so as to sandwich the second conductor 31, in the orthogonal direction. Accordingly, since the joining portion 10A becomes thicker than the first conductor 21 and the second conductor 31 and the sectional area of the joining portion 10A becomes larger than the sectional areas of the first conductor 21 and the second conductor 31, the electric resistance of the joining portion 10A is reduced, and heat generation of the joining portion 10A at the time of energization can be suppressed. Since the increase in the sectional area of the joining portion 10A increases the strength of the joining portion 10A and, for example, durability of the joining portion of the electric wire relative to vehicle vibration can be improved.

Furthermore, in the joining method of the electric wire 1A described above, since the molding surfaces 50b and 51b and the tapered molding surfaces 50c and 51c form a smooth surface around the axial direction of the melted material, the burrs of the melted material bulged outward from the outer circumferential surface of the joining portion 10A are suppressed, and the cost required for removing the burrs can be reduced. Furthermore, the damage to the protective tube 11 covering the joining portion 10A can be reduced.

In the joining method of the electric wire 1A described above, the molding surfaces 50b and 51b form the smooth surface in parallel to the axial direction and around the axial direction. As a result, a flat smooth surface can be formed around the axial direction on the joining portion 10A.

With the joining method of the electric wire 1A described above, the molding surfaces 50b and 51b form the smooth surface as a columnar outer surface having a central axis in the axial direction. As a result, the smooth surface can be formed on the joining portion 10A as a columnar outer surface.

In the joining method of the electric wire 1A described above, the tapered molding surfaces 50c and 51c forms a smooth surface as the tapered surfaces 40b which is tapered from the both ends of the outer surface in the axial direction toward the respective outer surfaces of the first conductor 21 and the second conductor 31. As a result, the tapered surfaces 40b can be easily formed at both axial ends of the outer surface 40a of the bulging portion 40A.

Furthermore, in the joining method of the electric wire 1A described above, the molding surfaces 50b and 51b forming the outer surface 40a of the bulging portion 40A are divided into a first molding surface and a second molding surface in the axial direction. The first jig electrode 50 is formed integrally with the first molding surface in the axial direction. The second jig electrode 51 is formed integrally with the second molding surface in the axial direction. Thus, when the electric wire 1A is joined, a smooth surface can be easily formed around the axial direction of the bulging portion 40A by the molding surfaces 50b and 51b.

In the joining method of the electric wire 1A described above, the widths of the molding surfaces 50b and 51b are formed to be smaller than the smaller one of the width of the first electric wire 2, including the first conductor 21 and the insulating first insulating cover portion 22 covering the outer circumference of the first conductor 21, in the orthogonal direction and the width of the second electric wire 3, including the second conductor 31 and the insulating second insulating cover portion 32 covering the outer circumference of the second conductor 31, in the orthogonal direction, and the lengths of the molding surfaces 50b and 51b in the axial direction are formed to be shorter than the shorter one of the width of the first electric wire 2 in the orthogonal direction and the width of the second electric wire 3 in the orthogonal direction. With this structure, the size of the bulging portion 40A can be easily regulated.

Second Embodiment

Figure 8:
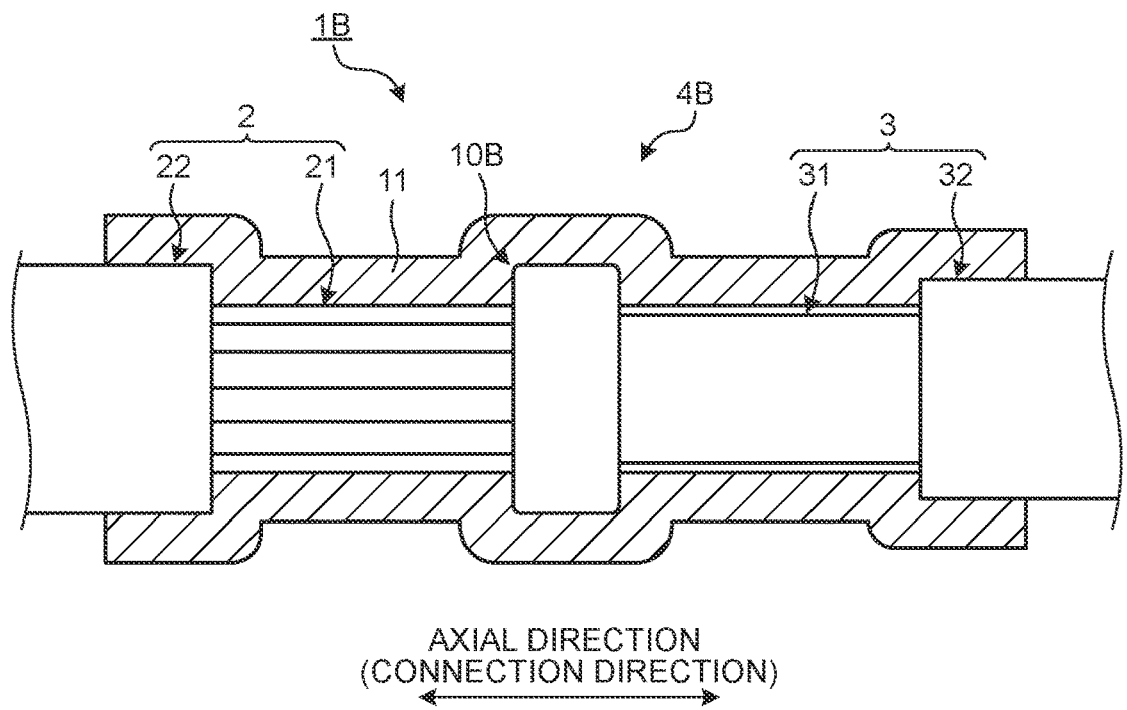
FIG. 8 is a partial cross-sectional view of a schematic structure of the joint structure of the electric wires according to the second embodiment.

Next, a joint structure of electric wires according to a second embodiment will be described with reference to FIGS. 7 and 8. FIG. 7 is a side view of a schematic structure of the joint structure of the electric wires according to the second embodiment. FIG. 8 is a partial cross-sectional view of a schematic structure of the joint structure of the electric wires according to the second embodiment. In addition, regarding the structures, functions, and effects common to those of the first embodiment, the overlapped description is omitted as possible (the same applies below).

A shape of a joint structure 4B of an electric wire 1B illustrated in FIGS. 7 and 8 is different from the joint structure 4A of the electric wire 1A. The electric wire 1B includes a first electric wire 2, a second electric wire 3, and the joint structure 4B.

In the joint structure 4B, the first electric wire 2 and the second electric wire 3 are physically and electrically joined to each other. The joint structure 4B includes a joining portion 10B and a protective tube 11.

The joining portion 10B is a part where the first conductor 21 and the second conductor 31 are joined to each other. The joining portion 10B is formed by butting and joining the end of the first conductor 21 and the end of the second conductor 31 to each other in the axial direction, for example, by resistance welding. The connection direction of the first conductor 21 and the second conductor 31 in the joining portion 10B is the direction along the axial direction of the first conductor 21 and the second conductor 31. The joining portion 10B has a bulging portion 40B formed at the time of joining.

The bulging portion 40B is a part where a smooth surface is formed by the molding surface of the jig electrode (or jig) to be used at the time of the resistance welding on the melted material bulged outward from the outer circumferential surface of the joining portion 10B. The bulging portion 40B has an outer surface 40a and a pair of annular surfaces 40c as a smooth surface. The outer surface 40a is provided in the orthogonal direction from the outer circumferential surface of the joining portion 10B and is formed in parallel to the axial direction and around the axial direction. The pair of annular surfaces 40c is formed from both axial ends of the outer surface 40a toward the respective outer circumferential surfaces of the first conductor 21 and the second conductor 31 in the orthogonal direction.

In the joining method of the electric wire 1B according to the second embodiment, the first jig electrode 50 and the second jig electrode 51 have the annular molding surface in the orthogonal direction to form the pair of annular surfaces 40c configuring the bulging portion 40B. The joining method of the electric wire 1B according to the second embodiment is different from the joining method of the electric wire 1A in this point.

The joining method of the electric wire 1B according to the second embodiment can obtain the effect similar to that of the joining method of the electric wire 1A.

Modification

Figure 9:
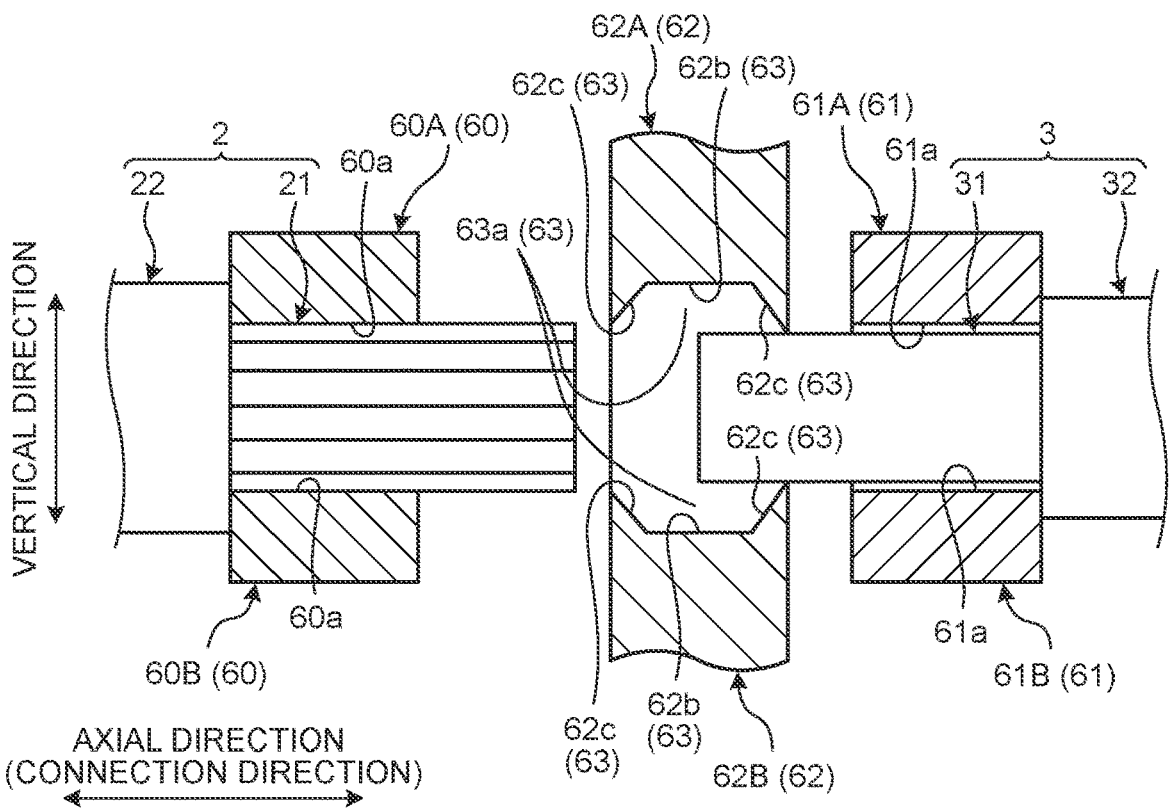
FIG. 9 is a diagram to describe an exemplary joining method of electric wires according to a modification of the first embodiment.
Figure 10:
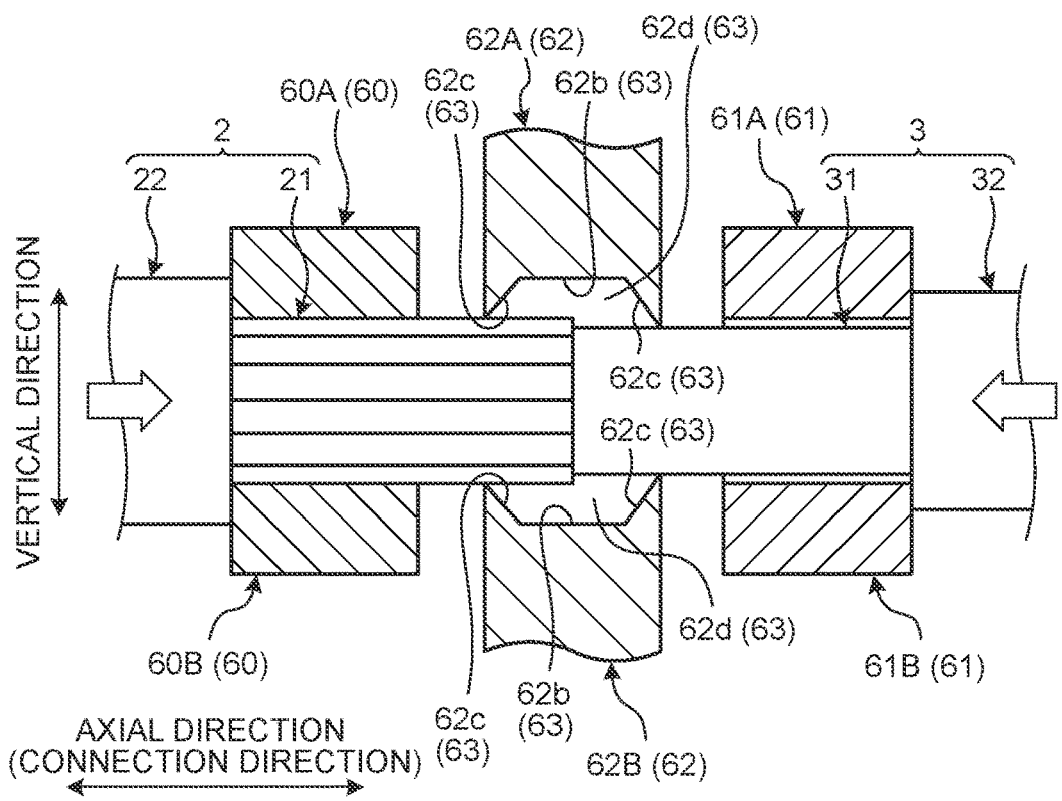
FIG. 10 is a diagram to describe an exemplary joining method of the electric wires according to the modification of the first embodiment.
Figure 11:
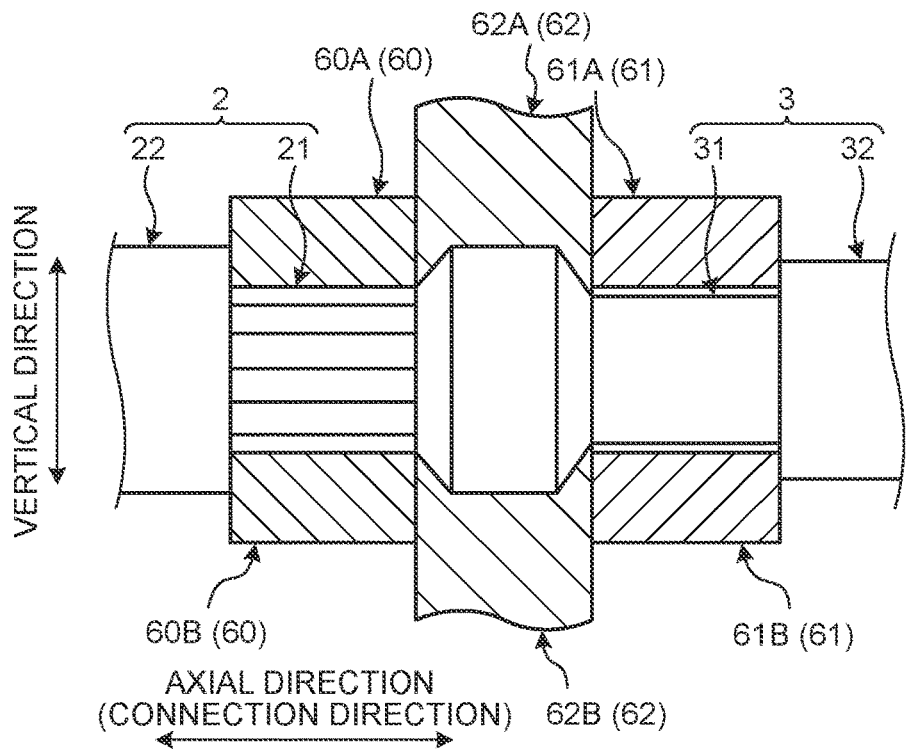
FIG. 11 is a diagram to describe an exemplary joining method of the electric wires according to the modification of the first embodiment.

Next, a joining method of electric wires according to a modification of the first embodiment will be described with reference to FIGS. 9 to 11. FIGS. 9 to 11 are diagrams to describe an exemplary joining method of electric wires according to the modification of the first embodiment. In FIG. 9, a state before two electric wires attached to jig electrodes are joined to each other is illustrated. In FIG. 10, a state at the time of joining the two electric wires attached to the jig electrodes is illustrated. In FIG. 11, a state at the time when the two electric wires attached to the jig electrodes have been joined to each other is illustrated.

In another joining method of the electric wire 1A according to the modification of the first embodiment, a resistance welding machine (not illustrated) including a pair of jig electrodes and a jig to form a bulging portion 40A is used.

In a holding process illustrated in FIG. 9, a first electric wire 2 in which an end of a first conductor 21 is exposed from a first insulating cover portion 22 and a second electric wire 3 in which an end of a second conductor 31 is exposed from a second insulating cover portion 32 are set in the resistance welding machine. Specifically, in the holding process, the first conductor 21 and the second conductor 31 are arranged to be opposed to each other in the axial direction, and the end of the first conductor 21 is held by holding surfaces 60a in first jig electrodes 60 (60A and 60B) from the side of the outer circumference, and the end of the second conductor 31 is held by holding surfaces 61a in second jig electrodes 61 (61A and 61B) from the side of the outer circumference. In addition, jigs 62 (62A and 62B) are attached to cover the top end of the second conductor 31 that projects from the second jig electrode 61 in the axial direction.

Although each of the first jig electrodes 60 and the second jig electrodes 61 is an electrode for welding, each of the first jig electrodes 50 and the second jig electrodes 51 is also a jig for holding the first conductor 21 and the second conductor 31 to be welded. The first jig electrode 60 and the second jig electrode 61 respectively hold the end of the first conductor 21 and the end of the second conductor 31 so as to face each other in the axial direction. The first jig electrode 60 is divided into an upper jig electrode 60A and a lower jig electrode 60B. The upper jig electrode 60A and the lower jig electrode 60B hold the end of the first conductor 21 so as to sandwich the end of the first conductor 21 in the orthogonal direction (for example, vertical direction illustrated in FIG. 9). The second jig electrode 61 is divided into an upper jig electrode 61A and a lower jig electrode 61B. The upper jig electrode 61A and the lower jig electrode 61B hold the end of the second conductor 31 so as to sandwich the end of the second conductor 31 in the orthogonal direction (for example, vertical direction illustrated in FIG. 9).

The first jig electrode 60 has a holding surface 60a. The holding surface 60a is a first holding surface, and holds the first conductor 21 from the side of the outer circumference. The holding surface 60a is a cylindrical inner circumferential surface, and is divided in the orthogonal direction. That is, the holding surface 60a holds the end of the first conductor 21 so as to sandwich the end in the orthogonal direction.

The second jig electrode 61 has a holding surface 61a. The holding surface 61a is a second holding surface, and holds the second conductor 31 from the side of the outer circumference. The holding surface 61a is a cylindrical inner circumferential surface, and is divided in the orthogonal direction. That is, the holding surfaces 51a hold the end of the second conductor 31 so as to sandwich the end in the orthogonal direction.

The jig 62 is divided into an upper jig 62A and a lower jig 62B. The upper jig 62A and the lower jig 62B are arranged to cover the top end of the second conductor 31 from the orthogonal direction (for example, vertical direction). The jig 62 has a molding surface 62b and a pair of tapered molding surfaces 62c. The molding surface 62b is a cylindrical inner circumferential surface and is a molding surface forming the outer surface 40a of the bulging portion 40A. The tapered molding surface 62c is a molding surface forming the tapered surface 40b of the bulging portion 40A.

Each of the jigs 62 according to the present embodiment has a bulge molding portion 63 which is formed to surround the joining portion 10A of the end of the first conductor 21 and the end of the second conductor 31 at the time of the joining and molding process illustrated in FIG. 11. The bulge molding portion 63 is a space in which the melted material is bulged outward from the outer circumferential surface of the joining portion 10A. That is, the bulge molding portion 63 is a space closed by the molding surface 62b, the tapered molding surfaces 62c, and the outer circumferential surface of the joining portion 10A. The bulge molding portion 63 is formed so that the widths of the molding surfaces 62b, opposed to each other so as to sandwich the joining portion 10A, in the orthogonal direction are larger than the larger one of the width of the holding surfaces 60a, opposed to each other so as to sandwich the first conductor 21, in the orthogonal direction and the width of the holding surfaces 61a, opposed to each other so as to sandwich the second conductor 31, in the orthogonal direction. It is preferable that the maximum width of the molding surfaces 62b, opposed to each other so as to sandwich the joining portion 10A, in the orthogonal direction be formed to be larger than the larger one of the width of the holding surfaces 60a, opposed to each other so as to sandwich the first conductor 21, in the orthogonal direction and the width of the holding surfaces 61a, opposed to each other so as to sandwich the second conductor 31, in the orthogonal direction. Furthermore, it is preferable that the maximum width of the molding surfaces 62b, opposed to each other so as to sandwich the joining portion 10A, in the orthogonal direction be formed to be smaller than the larger one of the width (or diameter) of the first electric wire 2 in the orthogonal direction and the width (or diameter) of the second electric wire 3 in the orthogonal direction.

The bulge molding portion 63 is formed so that the sectional area of an inner space surrounded by the molding surfaces 62b opposed each other so as to sandwich the joining portion 10A in the axial direction is larger than the larger one of the sectional area of an inner space surrounded by the holding surfaces 60a opposed to each other so as to sandwich the first conductor 21 in the axial direction and the sectional area of an inner space surrounded by the holding surfaces 61a opposed to each other so as to sandwich the second conductor 31 in the axial direction. It is preferable that the maximum sectional area of the inner space surrounded by the molding surfaces 62b opposed each other so as to sandwich the joining portion 10A in the axial direction be formed to be larger than the larger one of the sectional area of the inner space surrounded by the holding surfaces 60a opposed to each other so as to sandwich the first conductor 21 in the axial direction and the sectional area of the inner space surrounded by the holding surfaces 61a opposed to each other so as to sandwich the second conductor 31 in the axial direction. Furthermore, it is preferable that the maximum sectional area of the inner space surrounded by the molding surfaces 62b opposed to each other so as to sandwich the joining portion 10A in the axial direction be formed to be smaller than the larger one of the sectional area of the first electric wire 2 in the axial direction and the sectional area of the second electric wire 3 in the axial direction.

Next, in an approach process illustrated in FIG. 10, the first jig electrode 60 and the second jig electrode 61 are relatively moved to be opposed to each other in the axial direction, and the end of the first conductor 21 approaches the end of the second conductor 31.

Next, in the joining and molding process illustrated in FIG. 11, by energizing the first jig electrode 60 and the second jig electrode 61, while heating the ends of the first conductor 21 and the second conductor 31, the first conductor 21 and the second conductor 31 are butted and joined to each other in the axial direction, and the bulge molding portion 63 makes the melted material bulge outward from the outer circumferential surface of the joining portion 10A of the end of the first conductor 21 and the end of the second conductor 31. Then, the bulging portion 40A is formed by the molding surfaces 62b of the bulge molding portion 63 and the tapered molding surfaces 62c. Specifically, the end of the first conductor 21 is heated by energizing the first jig electrode 60, and the end of the second conductor 31 is heated by energizing the second jig electrode 61. After the end of the first conductor 21 and the end of the second conductor 31 have been sufficiently heated, the energization to the first jig electrode 60 and the second jig electrode 61 is stopped. Then, until the end of the first jig electrode 60 in the axial direction and the end of the second jig electrode 61 in the axial direction respectively have contact with the end of the jigs 62 in the axial direction, the end of the first conductor 21 and the end of the second conductor 31 are pressurized to be butted to each other in the axial direction. At this time, the melted material generated at the time of metal bonding between the first conductor 21 and the second conductor 31 bulges to the bulge molding portion 63, and the bulging portion 40A is formed by the molding surfaces 62b and the tapered molding surfaces 62c. That is, the outer surface 40a of the bulging portion 40A is formed by the molding surface 62b of the jig 62. The tapered surface 40b of the bulging portion 40A is formed by the tapered molding surface 62c of the jig 62.

In the above description, resistance welding is used as a method of joining the electric wires. However, the present invention is not limited this, and the method may be ultrasonic welding or the like.

Furthermore, in the above description, the bulging portion 40A has the outer surface 40a and the tapered surface 40b as the smooth surfaces. However, at least one of the outer surface 40a and the tapered surface 40b may be formed as a curved surface. For example, it is preferable that the outer surface 40a and the tapered surface 40b be spherical surfaces having a radius r (=D/2) centered on the central axis of the bulging portion 40A.

Furthermore, in the above description, the protective tube 11 is described as a heat shrinkable tube. However, the protective tube 11 is not limited to this. For example, the protective tube 11 may be formed of a member of which a diameter becomes smaller due to shrinkage caused by ultraviolet (UV) irradiation, chemical application, and the like. Alternatively, the protective tube 11 may be formed of an adhesive tape which can be wound around the joining portions 10A and 10B.

Furthermore, in the above description, the jig electrodes hold and sandwich the first conductor 21 and the second conductor 31 in the vertical direction. However, the direction is not limited to this, and the jig electrodes may have a structure for holding and sandwiching the first conductor 21 and the second conductor 31 in axial direction and the width direction orthogonal to the vertical direction.

With the joining method of electric wires according to the present embodiment, in a joining and molding process, a melted material is bulged outward from an outer circumferential surface of a joining portion to a bulge molding portion formed to surround a joining portion of an end of a first conductor and an end of a second conductor. The bulge molding portion is formed so that the widths of molding surfaces, opposed to each other so as to sandwich the joining portion, in the orthogonal direction orthogonal to an axial direction are larger than the larger one of the width of first holding surfaces, opposed to each other so as to sandwich the first conductor, in the orthogonal direction and the width of second holding surfaces, opposed to each other so as to sandwich the second conductor, in the orthogonal direction. Accordingly, since the joining portion becomes thicker than the first conductor and the second conductor and the sectional area of the joining portion becomes larger than the sectional areas of the conductors, the electric resistance of the joining portion is reduced, and heat generation of the joining portion at the time of energization can be suppressed. In addition, since the sectional area of the joining portion is increased, the strength of the joining portion can be improved.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A joining method of electric wires comprising:
   a holding step of arranging a conductive first conductor formed by a plurality of element wires and a conductive second conductor formed in a bar shape to be opposed to each other in an axial direction, holding an end of the first conductor by a first holding surface of a first jig electrode from an outer circumference side, and holding an end of the second conductor by a second holding surface of a second jig electrode from an outer circumference side;
   an approaching step of relatively moving the first jig electrode and the second jig electrode to be opposed to each other in the axial direction and moving the end of the first conductor and the end of the second conductor to be closer to each other; and
   a joining and molding step of abutting and joining the end of the first conductor and the end of the second conductor while heating the ends by energizing the first jig electrode and the second jig electrode and bulging a melted material outward from an outer circumferential surface of a joining portion to a bulge molding portion formed to surround the joining portion of the end of the first conductor and the end of the second conductor, wherein
   the bulge molding portion has molding surfaces on the first jig electrode and the second jig electrode to mold the melted material and is formed so that widths of opposing portions of the molding surfaces opposed to each other so as to sandwich the joining portion in an orthogonal direction orthogonal to the axial direction are larger than a larger one of the widths of opposing portions of the first holding surface opposed to each other so as to sandwich the first conductor in the orthogonal direction and the widths of opposing portions of the second holding surface opposed to each other so as to sandwich the second conductor in the orthogonal direction.

2. The joining method of the electric wires according to claim 1, wherein
   the molding surfaces form a smooth surface around an axial direction of the melted material.

3. The joining method of the electric wires according to claim 2, wherein
   the molding surfaces form the smooth surface in parallel to the axial direction and around the axial direction.

4. The joining method of the electric wires according to claim 3, wherein
   the molding surfaces form the smooth surface as a columnar outer surface having a central axis in the axial direction.

5. The joining method of the electric wires according to claim 4, wherein
   the molding surfaces form the smooth surface as tapered surfaces to be tapered from both ends of the outer surface in the axial direction toward the respective outer surfaces of the first conductor and the second conductor.

6. The joining method of the electric wires according to claim 5, wherein
   the molding surfaces are divided into a first molding surface and a second molding surface in the axial direction,
   the first jig electrode is formed integrally with the first molding surface in the axial direction, and
   the second jig electrode is formed integrally with the second molding surface in the axial direction.

7. The joining method of the electric wires according to claim 4, wherein
   the molding surfaces are divided into a first molding surface and a second molding surface in the axial direction,
   the first jig electrode is formed integrally with the first molding surface in the axial direction, and
   the second jig electrode is formed integrally with the second molding surface in the axial direction.

8. The joining method of the electric wires according to claim 3, wherein
   the molding surfaces are divided into a first molding surface and a second molding surface in the axial direction,
   the first jig electrode is formed integrally with the first molding surface in the axial direction, and
   the second jig electrode is formed integrally with the second molding surface in the axial direction.

9. The joining method of the electric wires according to claim 3, wherein
the width of the molding surfaces are formed to be smaller than the smaller one of a width in the orthogonal direction of a first wiring member including the first conductor and an insulating first insulating cover portion covering a side of an outer circumference of the first conductor and a width in the orthogonal direction of a second wiring member including the second conductor and an insulating second insulating cover portion covering a side of an outer circumference of the second conductor, and
a length of the molding surfaces in the axial direction is formed to be shorter than the shorter one of the width of the first wiring member in the orthogonal direction and the width of the second wiring member in the orthogonal direction.

10. The joining method of the electric wires according to claim 2, wherein
the molding surfaces form the smooth surface as a columnar outer surface having a central axis in the axial direction.

11. The joining method of the electric wires according to claim 10, wherein
the molding surfaces form the smooth surfaces as tapered surfaces to be tapered from both ends of the outer surface in the axial direction toward the respective outer surfaces of the first conductor and the second conductor.

12. The joining method of the electric wires according to claim 11, wherein
the molding surfaces are divided into a first molding surface and a second molding surface in the axial direction,
the first jig electrode is formed integrally with the first molding surface in the axial direction, and
the second jig electrode is formed integrally with the second molding surface in the axial direction.

13. The joining method of the electric wires according to claim 11, wherein
the width of the molding surfaces are formed to be smaller than the smaller one of a width in the orthogonal direction of a first wiring member including the first conductor and an insulating first insulating cover portion covering a side of an outer circumference of the first conductor and a width in the orthogonal direction of a second wiring member including the second conductor and an insulating second insulating cover portion covering a side of an outer circumference of the second conductor, and
a length of the molding surfaces in the axial direction is formed to be shorter than the shorter one of the width of the first wiring member in the orthogonal direction and the width of the second wiring member in the orthogonal direction.

14. The joining method of the electric wires according to claim 10, wherein
the molding surfaces are divided into a first molding surface and a second molding surface in the axial direction,
the first jig electrode is formed integrally with the first molding surface in the axial direction, and
the second jig electrode is formed integrally with the second molding surface in the axial direction.

15. The joining method of the electric wires according to claim 10, wherein
the width of the molding surfaces are formed to be smaller than the smaller one of a width in the orthogonal direction of a first wiring member including the first conductor and an insulating first insulating cover portion covering a side of an outer circumference of the first conductor and a width in the orthogonal direction of a second wiring member including the second conductor and an insulating second insulating cover portion covering a side of an outer circumference of the second conductor, and
a length of the molding surfaces in the axial direction is formed to be shorter than the shorter one of the width of the first wiring member in the orthogonal direction and the width of the second wiring member in the orthogonal direction.

16. The joining method of the electric wires according to claim 2, wherein
the molding surfaces are divided into a first molding surface and a second molding surface in the axial direction,
the first jig electrode is formed integrally with the first molding surface in the axial direction, and
the second jig electrode is formed integrally with the second molding surface in the axial direction.

17. The joining method of the electric wires according to claim 2, wherein
the width of the molding surfaces are formed to be smaller than the smaller one of a width in the orthogonal direction of a first wiring member including the first conductor and an insulating first insulating cover portion covering a side of an outer circumference of the first conductor and a width in the orthogonal direction of a second wiring member including the second conductor and an insulating second insulating cover portion covering a side of an outer circumference of the second conductor, and
a length of the molding surfaces in the axial direction is formed to be shorter than the shorter one of the width of the first wiring member in the orthogonal direction and the width of the second wiring member in the orthogonal direction.

18. The joining method of the electric wires according to claim 1, wherein
the molding surfaces are divided into a first molding surface and a second molding surface in the axial direction,
the first jig electrode is formed integrally with the first molding surface in the axial direction, and
the second jig electrode is formed integrally with the second molding surface in the axial direction.

19. The joining method of the electric wires according to claim 18, wherein
the width of the molding surfaces are formed to be smaller than the smaller one of a width in the orthogonal direction of a first wiring member including the first conductor and an insulating first insulating cover portion covering a side of an outer circumference of the first conductor and a width in the orthogonal direction of a second wiring member including the second conductor and an insulating second insulating cover portion covering a side of an outer circumference of the second conductor, and
a length of the molding surfaces in the axial direction is formed to be shorter than the shorter one of the width of the first wiring member in the orthogonal direction and the width of the second wiring member in the orthogonal direction.

20. The joining method of the electric wires according to claim 1, wherein
- the width of the molding surfaces are formed to be smaller than the smaller one of a width in the orthogonal direction of a first wiring member including the first conductor and an insulating first insulating cover portion covering a side of an outer circumference of the first conductor and a width in the orthogonal direction of a second wiring member including the second conductor and an insulating second insulating cover portion covering a side of an outer circumference of the second conductor, and
- a length of the molding surfaces in the axial direction is formed to be shorter than the shorter one of the width of the first wiring member in the orthogonal direction and the width of the second wiring member in the orthogonal direction.

21. A joining method of electric wires comprising:
- a holding step of arranging a conductive first conductor formed by a plurality of element wires and a conductive second conductor formed in a bar shape to be opposed to each other in an axial direction, holding an end of the first conductor by a first holding surface of a first jig electrode from an outer circumference side, and holding an end of the second conductor by a second holding surface of a second jig electrode from an outer circumference side;
- an approaching step of relatively moving the first jig electrode and the second jig electrode to be opposed to each other in the axial direction and moving the end of the first conductor and the end of the second conductor to be closer to each other; and
- a joining and molding step of abutting and joining the end of the first conductor and the end of the second conductor while heating the ends by energizing the first jig electrode and the second jig electrode and bulging a melted material outward from an outer circumferential surface of a joining portion to a bulge molding portion formed to surround the joining portion of the end of the first conductor and the end of the second conductor, wherein
- in the joining and molding step, until the end of the first jig electrode in the axial direction and the end of the second jig electrode in the axial direction have contact with each other, the end of the first conductor and the end of the second conductor are pressurized to be butted to each other in the axial direction, and
- the bulge molding portion has molding surfaces on the first jig electrode and the second jig electrode to mold the melted material and is formed so that widths of opposing portions of the molding surfaces opposed to each other so as to sandwich the joining portion in an orthogonal direction orthogonal to the axial direction are larger than a larger one of the widths of opposing portions of the first holding surface opposed to each other so as to sandwich the first conductor in the orthogonal direction and the widths of opposing portions of the second holding surface opposed to each other so as to sandwich the second conductor in the orthogonal direction.

* * * * *